United States Patent Office 2,994,315
Patented Aug. 1, 1961

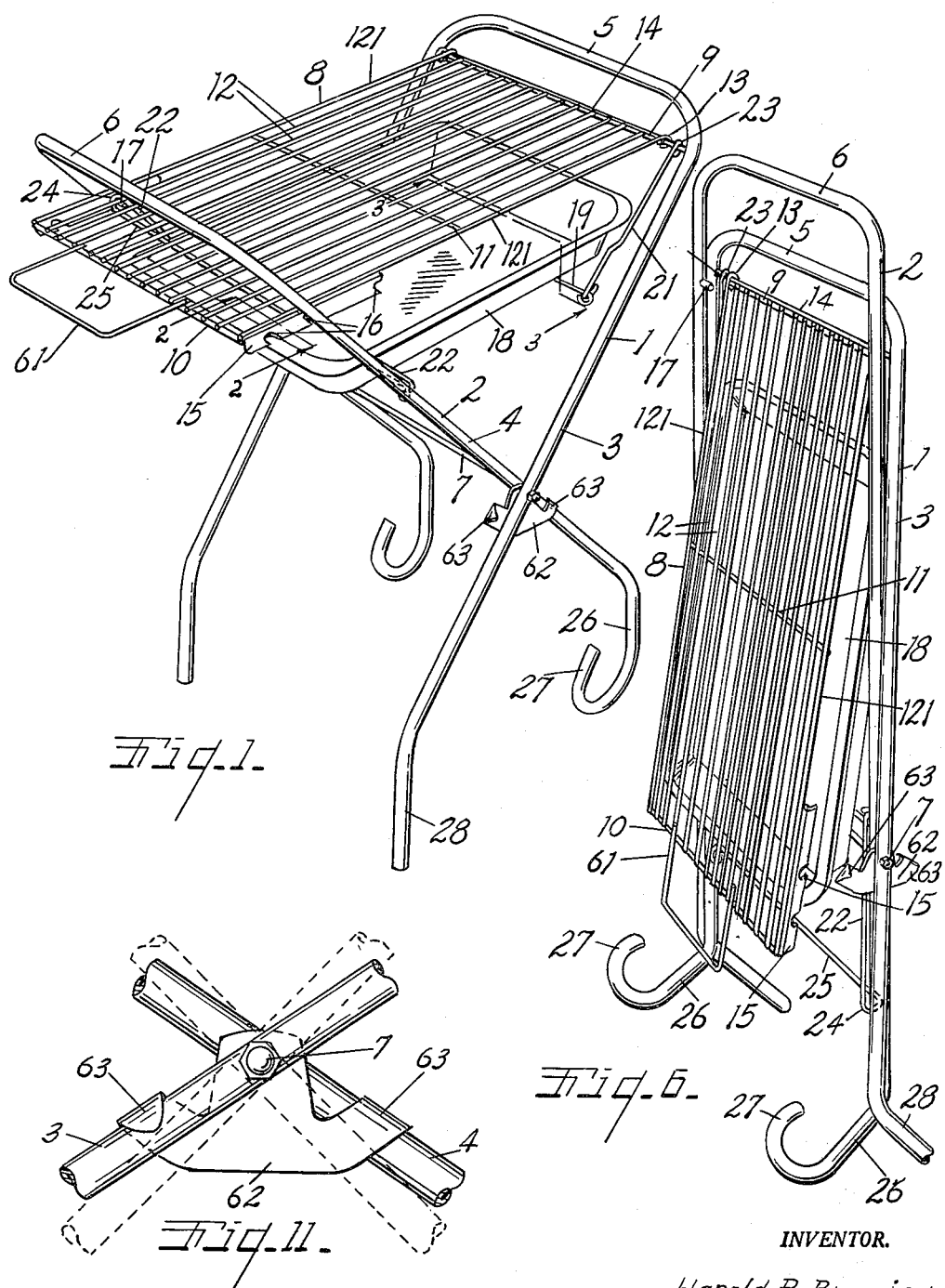

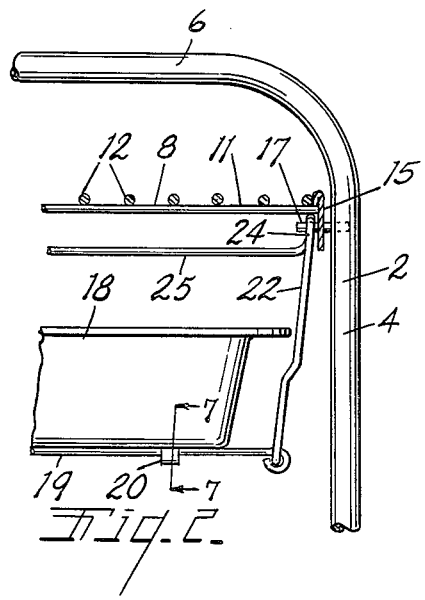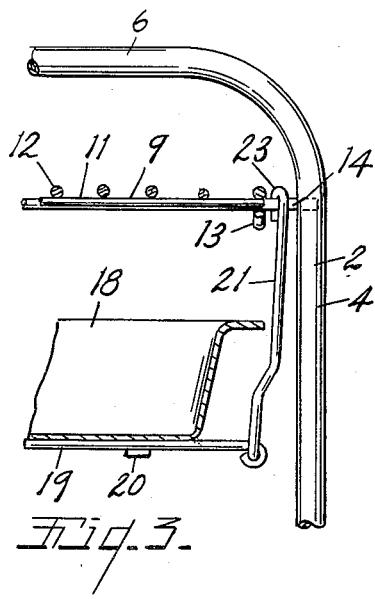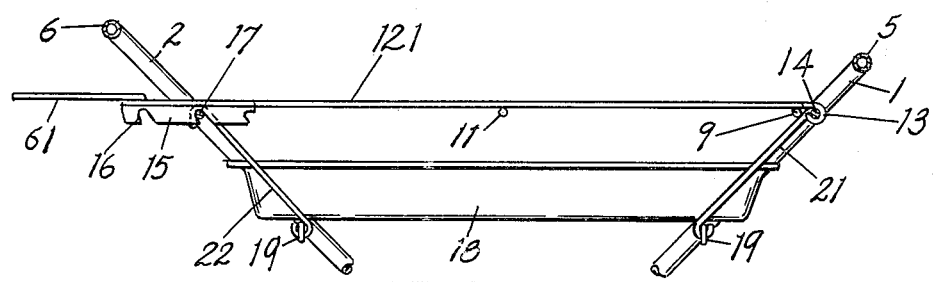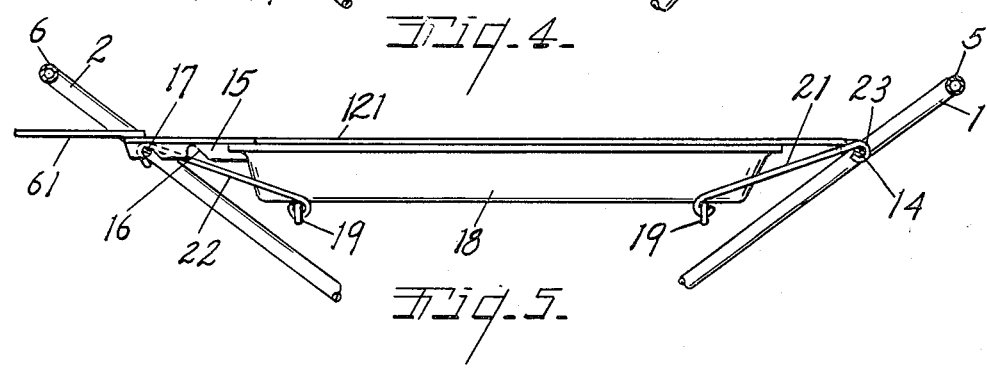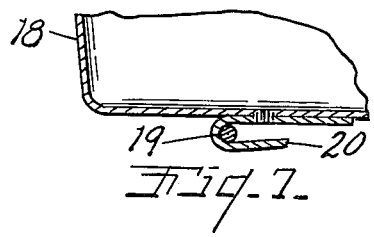

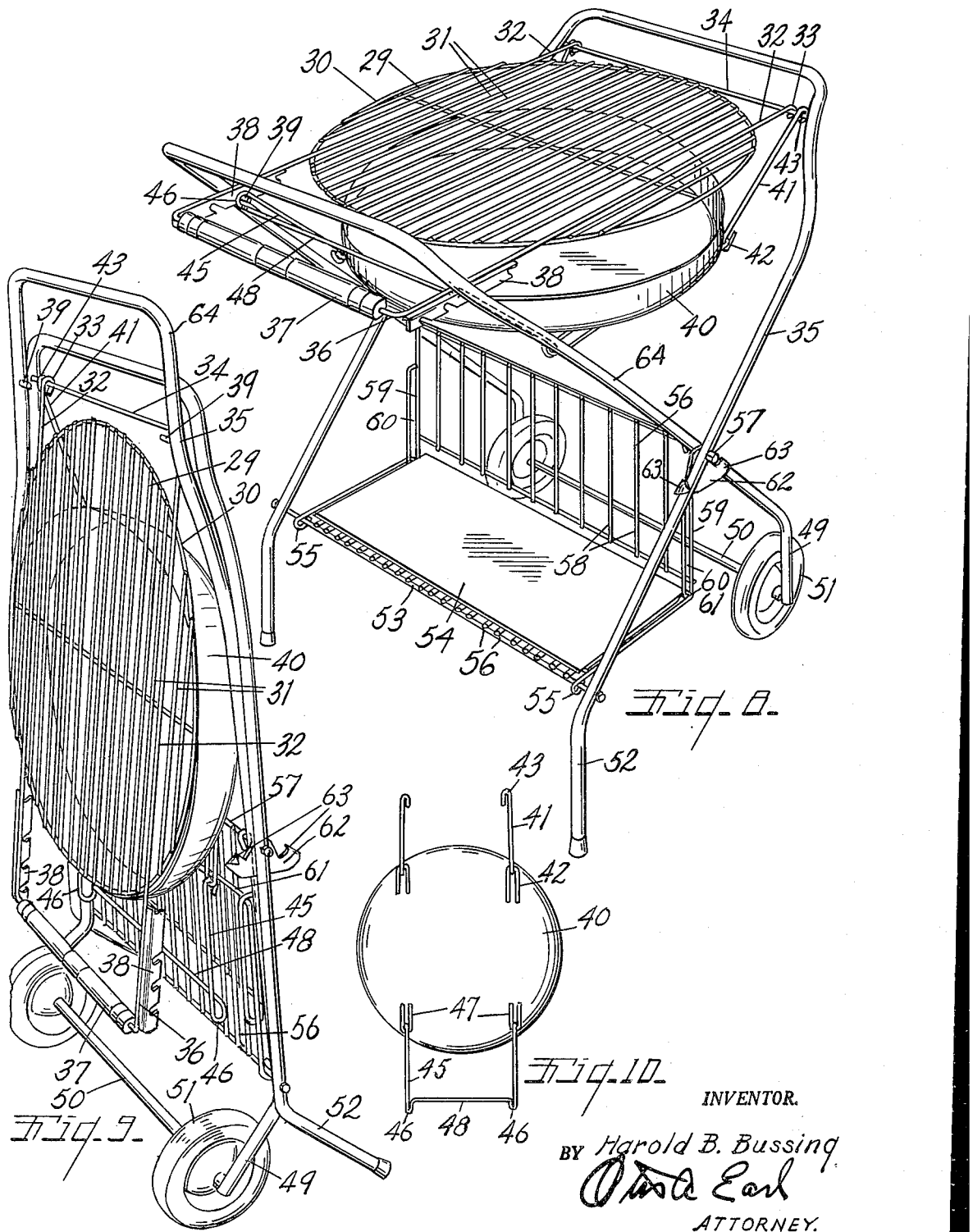

2,994,315
PORTABLE GRILL
Harold B. Bussing, Albion, Mich., assignor to Union Steel Products Company, Albion, Mich.
Filed Jan. 25, 1955, Ser. No. 483,972
5 Claims. (Cl. 126—9)

This invention mainly relates to collapsible portable grills. The main objects of this invention are:

First, to provide a portable grill including a collapsible supporting frame and a grid with fuel pan associated therewith, the parts being readily adjustable to vary the spacing of the fuel pan relative to the grid.

Second, to provide a collapsible grill including a grid and fuel pan assembled as a unit which may be quickly erected from collapsed position and quickly collapsed, and at the same time one which when erected is very securely retained in erected position.

Third, to provide a portable grill having these advantages which may be made of relatively light stock and at the same time is strong and durable.

Fourth, to provide a collapsible grill including a collapsible shelf in which the parts are so arranged that they do not materially detract from the compact collapsing of the structure.

Further objects relating to details and economies of the invention will appear from the description to follow. My invention is defined and pointed out in the claims.

A preferred embodiment of my invention is illustrated in the accompanying drawing, in which:

FIG. 1 is a perspective view of a grill embodying my invention erected and adjusted to one of its erected positions.

FIG. 2 is an enlarged fragmentary view, partially in section, on a line 2—2 of FIG. 1.

FIG. 3 is an enlarged fragmentary view in section on a line corresponding to lines 3—3 of FIG. 1.

FIG. 4 is a fragmentary view, partially in vertical longitudinal section, with the parts in position as shown in FIG. 1.

FIG. 5 is a fragmentary view corresponding to that of FIG. 4 with the parts in another position of adjustment.

FIG. 6 is a perspective view of the collapsed grill.

FIG. 7 is an enlarged fragmentary view on a line corresponding to line 7—7 of FIG. 2.

FIG. 8 is a perspective view of a modified embodiment of our invention with the parts in erected position.

FIG. 9 is a perspective view of the structure shown in FIG. 8 in collapsed position and with the flat shelf plate removed.

FIG. 10 is an inverted view of the fuel pan of the embodiments of FIGS. 8 and 9 and its hangers.

FIG. 11 is an enlarged fragmentary side elevational view showing the frame members as supported by the stops members; the parts being shown in erected position by dotted lines and in the stop engaging position by full lines.

The embodiment of my invention illustrated in FIGS. 1 to 7, inclusive, comprises a pair of frame members designated generally by the numerals 1 and 2 and comprising side pieces 3 and 4, respectively, connected at their upper ends by the cross pieces 5 and 6 respectively, desirably formed integrally therewith. The side pieces of the frame members are pivotally connected by the pivot rod 7.

The grid designated generally by the numeral 8 comprises end cross pieces 9 and 10 and intermediate crosspiece 11, and the longitudinal grid bars 12 are suitably spaced and fixedly secured to the cross pieces. The side grid bars 121 are provided with eyes 13 which swingably or pivotally engage the cross rod 14. With this arrangement the grid is pivotally supported to be adjusted to erected position, as shown in FIG. 1, or to collapsible position, as shown in FIG. 6.

At its swinging end, the grid is provided with coupling members 15 having longitudinally spaced downwardly facing keepers 16 selectively engageable with the studs 17 on the side pieces of the inner frame member 2. The grid is provided with a handle 61 on its swinging end which facilitates the adjustment of the grid to its erected position.

When erected, the grid constitutes a tie member for the frame members supporting them in their crossed relation and this avoids the necessity for other tie means.

The fuel pan 18 is suspended below the grid, the pan being supported by the cross rods 19 spaced from the ends thereof and desirably detachable connected thereto by the oppositely facing loops 20 on the bottom of the pan, see FIG. 7. The cross rods 19 are provided with hanger links 21 and 22, swingably connected at their lower ends to the rods 19. The hangers 21 are provided with eyes 23 at their upper ends engaging the pivot rod 14 for the grid. The hanger links 22 are provided with hooks 24 engageable with the studs 17. The hooks 24 are connected by the cross rod 25 which prevents their sliding off the studs.

With this arrangement of parts the spacing of the pan relative to the grid may be varied by adjusting the coupling members 15. This spacing adjustment is desirable to meet varying cooking requirements as it is frequently desirable in cooking one item that the pan be adjusted to one position at one stage of cooking, and to another position at another stage of cooking.

The cross pieces 5 and 6 constitute hand holds. The adjustment may be readily accomplished by grasping the cross piece 6 with one hand, and the grid handle 61 with the other. When in adjusted position, the structure is rigid and secure against accidental collapsing.

The side pieces 2 are provided with angularly disposed lower end portions 26 terminating in curved loops 27 which in effect constitute shoes, facilitating the sliding of the grid on a surface. The lower end portions 28 of the side pieces are also angularly disposed so that when the structure is collapsed these end portions 26 and 28 of the side members are disposed in crossed relation and serve to support the structure in upright position.

To collapse the structure, it is only necessary to disengage the coupling members 15 and the hangers 22 from the studs 17.

In the embodiment shown in FIGS. 8 to 10, inclusive, the grid 29 is circular and comprises a circular rim 30, and the grid bars 31 and 32. The grid bars 32 are extended beyond the rim and provided with eyes 33 which engage the cross rod 34 extending between the side pieces 35 of the outer frame member. These grid bars 32 are extended beyond the grid at their other ends and are connected by the cross piece 36 which is provided with a grip 37 to provide a handle for the grid.

The coupling members 38, corresponding to the coupling members 15, are secured to the bars 32 and are engageable with the studs 39 on the inner side of the inner frame member 64 corresponding to the studs 17.

The fuel pan 40 is provided with link-like hangers 41 attached thereto by means of the loops 42. The hangers 41 are provided with eyes 43 engaging the rod 34. The hangers 45 are provided with hooks 46 detachably engageable with the stud 39. These hangers 45 are connected to the pan by the loops 47 and the hooks are connected by the cross piece 48 which prevents their slipping off the studs when the pan is loaded.

In this embodiment the side pieces of the inner frame members are provided with angularly disposed lower ends 49 carrying the axle 50 for the wheels 51. The lower ends of the side pieces 35 are angularly disposed, as shown at 52.

A shelf supporting rod 53 extends between the side pieces of the outer frame member, and constitutes a support for the front edge of the self 54, which is provided with eyes 55 pivotally engaging the rod. The rear end of the shelf is supported by the combined shelf back wall and hanger member 56, which depends from the frame member pivot rod 57 corresponding to the pivot rod 7. The slats 58 of the hanger member are desirably secured directly to the pivot rod. The hanger member has end pieces 59, which are conformed to provide slots 60 with which the rear cross piece 61 of the shelf is engaged so that when the frame members are collapsed, the rear edge of the shelf may be swung upwardly into overlapping relation to its hanger, as is shown in FIG. 9.

The shelf is automatically erected when the frame members are adjusted to erected position.

The adjustment of the grid relative to the frame members does not affect the shelf except as to a slight variation in the angle of the hanger relative to the shelf.

I preferably provide both embodiments of my invention with stops 62 adapted to limit the downward collapsing of the frame members in the event that the operator accidently or otherwise fails to properly manipulate the grid to serve its function as a tie member for the erected frame members. The stop members 62 are pivotally mounted on the pivot rods for the frame members and disposed between the corresponding side members of the frame members. The members 62 are provided with stop lugs or fingers 63 which project oppositely to engage the outer sides of the frame member side pieces as is illustrated in FIG. 11. The lugs 63 are desirably curved and when engaged serve to sustain lateral stresses on the side members which might result from a sudden collapsing movement of the frame members.

Both embodiments of my invention are highly desirable in performing their intended functions, and are attractive in appearance as well.

I have not attempted to illustrate or describe other embodiments or adaptations of my invention as it is believed this disclosure will enable those skilled in the art to embody or adapt my invention as may be desired.

Having thus described the invention, what is claimed as new and desired to secure by Letters Patent is:

1. A collapsible grill comprising frame members including side pieces, a pivot rod extending between the side pieces and pivotally connecting the frame members to permit adjustment thereof to crossed erected relation or to substantially parallel collapsed relation, a grill pivotally connected to one frame member, and detachably connected to the other frame member, said grill when erected constituting a tie-member for the frame members, a shelf supporting rod extending between the side pieces of one frame member in spaced relation to said pivot rod, a shelf pivotally mounted at its outer edge on said shelf supporting rod, a slotted shelf hanger member depending from said frame member pivot rod and provided with slots at its ends, said shelf having means at the ends thereof slidably engaged in said slots, whereby the shelf and its said hanger may be collapsed into overlapping relation between the frame members, said hanger member constituting a back for the shelf when the shelf is in erected position.

2. A collapsible grill comprising frame members including side pieces, a pivot rod extending between the side pieces and pivotally connecting the frame members to permit adjustment thereof to crossed erected relation or to substantially parallel collapsed relation, a grill mounted on said frame members above their said pivot connectors, a shelf supporting rod extending between the side pieces of one frame member in spaced relation to said pivot rod, a shelf pivotally mounted at its outer edge on said shelf supporting rod, a slotted shelf hanger member depending from said frame member pivot rod and provided with slots at its ends, said shelf having means at the ends thereof slidably engaged in said slots, whereby the shelf and its said hanger may be collapsed into overlapping relation between the frame members, said hanger member constituting a back for the shelf when the shelf is in erected position.

3. A collapsible grill comprising inner and outer frame members including side pieces and connecting cross pieces at the upper ends thereof, said side pieces being pivotally connected intermediate their ends to be adjusted to a crossed erected relation or to a substantially parallel collapsed relation, a grid and fuel pan supporting cross rod extending between the side pieces of the outer frame member, the side pieces of the inner frame member being provided with inwardly projecting aligned grid and fuel pan supporting studs, a grid swingably connected at one end to said cross rod and provided with a handle at its swinging end and with coupling members having longitudinally spaced downwardly facing notch like keepers selectively engageable with said studs on said inner frame member, the grid when erected constituting a connecting tie member for said frame members, a fuel pan, two pairs of hanger links connected to said fuel pan, one pair of said links being swingably engaged with said cross rod and the other pair of said links being detachably engageable with said studs on said inner frame member, the selective engagement of said grid coupling members with said studs providing means for variably spacing the fuel pan relative to the grid, said grid and fuel pan being collapsibly supported on said rod when they are disengaged from said studs.

4. A collapsible grill comprising inner and outer frame members including side pieces and connecting cross pieces at the upper ends thereof, said side pieces being pivotally connected intermediate their ends to be adjusted to a crossed erected relation or to a substantially parallel collapsed relation, a grid and fuel pan supporting rod extending between the side pieces of the outer frame member, the side pieces of the inner frame member being provided with inwardly projecting aligned grid and fuel pan supporting studs, a grid swingably connected at one end to said rod and provided with a hand piece at its swinging end with coupling members having facing keepers releasably engageable with said studs on said inner frame member, the grid when erected constituting a tie member for said frame members, a fuel pan, two pairs of hanger links swingably connected to said fuel pan, one pair of said links being swingably connected to said outer frame members adjacent their upper ends and the other pair of said links being detachably engageable with said studs on said inner frame member, said grid and fuel pan being collapsible into side by side relation and suspendingly connected to said outer frame member when they are disengaged from said studs.

5. A collapsible grill comprising inner and outer frame members including side pieces and connecting cross pieces at the upper ends thereof, said side pieces being pivotally connected intermediate their ends to be adjusted to a crossed erected relation or to a substantially parallel collapsed relation, the side pieces of the inner member being provided with inwardly projecting studs, a grid pivotally connected at one end to said outer frame side members adjacent the upper ends thereof and provided with coupling members having longitudinally spaced downwardly facing notch like keepers selectively engageable with said studs on said inner frame member, the grid when erected constituting a connecting tie member for said frame members, a fuel pan, two pairs of hanger links pivotally connected to said fuel pan, one pair of said links being swingably mounted on said outer frame member adjacent the upper end thereof and the other pair of said links being detachably and swingably engageable with said studs on said inner frame member, the selective engagement of said grid coupling members with said studs providing means for variably spacing the fuel pan relative to the grid, said grid and fuel pan being collapsibly supported on said outer frame members when they are disengaged from said studs on said inner frame members.

References Cited in the file of this patent

UNITED STATES PATENTS

| | | |
|---|---|---|
| 1,214,086 | Shaw | Jan. 30, 1917 |
| 2,154,800 | Zumwinkel | Apr. 18, 1939 |
| 2,334,847 | Spiers | Nov. 23, 1943 |
| 2,484,239 | Moon et al. | Oct. 11, 1949 |
| 2,514,735 | Wilson et al. | July 11, 1950 |
| 2,530,166 | Johannsen | Nov. 14, 1950 |
| 2,531,684 | Jackson | Nov. 28, 1950 |
| 2,624,469 | Cadwell et al. | Jan. 6, 1953 |
| 2,787,996 | Rumsey | Apr. 9, 1957 |